: 3,399,124
ELECTROLYTIC PREPARATION OF
POLY-p-XYLYLENES
Heinrich G. Gilch, Plainfield, N.J., assignor to Union
Carbide Corporation, a corporation of New York
No Drawing. Filed Sept. 17, 1964, Ser. No. 397,316
30 Claims. (Cl. 204—72)

This invention relates to a process for the preparation of poly-p-xylylenes. More particularly, this invention relates to the electrolytic preparation of poly-p-xylylenes.

Heretofore, the preparation of poly-p-xylylenes has been accomplished, generally, by pyrolytic processes. These processes have not been highly successful, economical or commercially feasible since they are complex and the amount of poly-p-xylylenes obtained therefrom have been relatively small and of little commercial value. Furthermore, these processes employ relatively high temperatures and involve interfering side reactions which render them difficult to control and commercially unacceptable.

It is an object of this invention, therefore, to provide a process for the preparation of poly-p-xylylenes which is simple, economic and commercially feasible.

Another object of this invention is to provide a process which does not require the use of high temperatures and avoids significant loss of desired end product as a result of interfering side reactions.

A further object of this invention is to provide a process which is fast, clean and results in higher operational efficiency than has been heretofore realizable.

Now, in accordance with the present invention, poly-p-xylylenes can be conveniently and readily obtained by the electrolysis of α-haloxylene compounds having the general structure

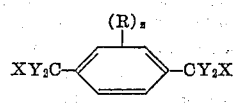

wherein Y is a member selected from the group consisting of hydrogen and halogens; X is a halogen having an equal or lower bond strength than that of Y with the proviso that when Y is fluorine, X is a halogen having a lower bond strength than fluorine; z is an integer from 0 to 4; R is an aromatic nuclear substituent group such as alkyl, aryl, alkenyl, amino, cyano carboxyl, alkoxy, hydroxy alkyl, carbalkoxy and inorganic radicals such as hydroxyl, nitro, halogens and other groups which are normally substitutable on aromatic nuclei.

As employed herein the term "bond strength" is understood to mean that quantity of energy required to break the covalent bond existing between the carbon atom and the substituent employed in the α-positions of the starting compounds.

The α-haloxylene compounds selected as the starting materials and having the general structure

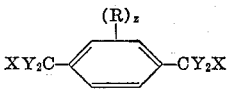

wherein Y, R, X and z are as above, are mixed in an electrolytic solvent and placed in an electrolytic cell equipped with a suitable anode and cathode.

An electromotive potential, supplied from any appropriate external electrical source, is applied across the electrodes. The amount of poly-p-xylylenes which can be obtained from the present process, as measured by the current efficiency, is in an amount of between about 60%–95% and higher.

The term "current efficiency" is understood to mean that quantity of poly-p-xylylene obtained as determined by the following equation:

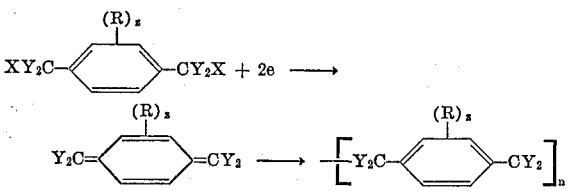

wherein X, Y, R and z are as above; e represents an electron and n can be an integer of between about 50–50 and higher. During electrolysis, the X⁻ (halide) is oxidized to the halogen which reaction is represented by the equation:

$$2X^- \rightarrow X_2\uparrow + 2e$$

wherein X and e are as above.

By employing an α-haloxylene compound having the general structure

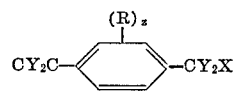

wherein X, Y, R and z are as above, it can be readily seen that a great variety of compounds can be selected for use as the starting material in the instant process. Typical of such compounds which can be employed are such α-haloxylenes as α,α'-dibromo-α,α,α',α',
α'-tetrafluoro-p-xylylene,
α,α'-dichloro-p-xylene,
α,α,α,α',α',α'-hexachloro-p-xylene,
α,α,α',α'-tetrachloro-p-xylene,
α,α'-dibromo-2-chloro-p-xylene,
α,α'-dibromo-p-xylene,
α,α',-2,5-tetrachloro-p-xylene,
α,α,α,α',α',α'-hexabromo-p-xylene,
α,α'-dibromo-2-methyl-p-xylene,
α,α'-dibromo-2-phenyl-p-xylene,
α,α'-dibromo-2-methoxy-p-xylene and so forth.

Surprisingly, polymerization of the α-haloxylenes occurs even though neither functional groups such as ethers, esters, amides, and the like, nor functionally active sites such as olefinic unsaturation are present in the α-haloxylenes employed.

The electrolytic solvent employed in the present invention can be comprised of any solvent system capable of acting as a good conductor while remaining inert during the reactions which take place in the system and also inert to the reaction product obtained.

It has been found that when only water is employed as the electrolyte, hydrogen formation occurs interfering with the electrolysis and preventing electrolytic reduction of the α-haloxylenes.

It has also been found that the water-soluble organic solvents can not be used alone as the electrolyte since they have little or no conductive properties.

Hence, suitable solvent systems have been found to be mixutres of water and water-soluble organic solvents such as tetrahydrofuran and water, dioxane and water, dimethylformamide and water, and so forth.

It has also been found that the conductivity of the solvent system can be materially increased and strengthened when a compound capable of dissociating into ions in the solvent system such as tetramethylammonium chloride, lithium chloride or a small amount of strong mineral acid, such as concentrated hydrochloric acid, concentrated sulfuric acid, concentrated nitric acid and so forth is added to the solvent in an amount of between about 2%–6% by volume of the solvent. A particularly suitable solvent system which can be employed in the present invention is that which consists of a mixture of dioxane, water and about 2% by volume of concentrated hydrochloric acid.

The anodes employed in the present process are selected from those materials which will not enter into reaction with any free halogens released during the process. Typical materials which can be employed are platinum, platinum metals, carbon and the like. In order to assure that the halogen formed at the anode does not enter into reaction with the reaction product, the anode can be isolated from the reaction by surrounding it with a suitable diaphragm so that the liquid surrounding the cathode is separated from the liquid which surrounds the anode.

If the halogen gases which form at the anode contact the liquid surrounding the cathode or the cathode itself, interfering side reactions will take place which will lower the efficiency of the system and decrease the amount of polymer obtainable. Additionally, there may also result a reversible reaction whereby the starting compound is obtained instead of the desired poly-p-xylylene.

The diaphragms which can be employed to isolate the anode should be selected from those materials which are porous, non-conductors, and which will not react with the electrolyte. Generally, any porous, ceramic material can be employed for this purpose such as silicates, aluminates, sintered aluminum oxides and so forth.

It is significant in the practice of this invention that when aqueous electrolytes are used, the material selected as the cathode be such that it will not affect the electrolysis of the solvent system when relatively low voltages are employed. If the electrolytic solvent contains any water or acid, the cathode must be capable of exhibiting an overvoltage sufficient to suppress the formation of hydrogen at the cathode.

The term "overvoltage" as employed herein is understood to mean that difference between the potential necessary to form hydrogen at the cathode and the theoretical potential. Hence, any material can be employed for the cathode which will not electrolyze the solvent system and which will not produce hydrogen before the $\alpha$-haloxylene compounds are reduced. Among the materials which can be used for the cathode are mercury, lead, cadmium, zinc, aluminum and so forth.

The overvoltage requirement of the cathode in aqueous electrolytic solvent systems gives rise to the proviso in the $\alpha$-haloxylene starting compounds that when Y is fluorine, X must be a member selected from the group of halogens having a lower bond strength than fluorine. It has been found that when X and Y are both fluorine in the $\alpha$-haloxylene compound, the formation of hydrogen at the cathode will occur before the $\alpha$-haloxylene compound employed is reduced. This phenomenon is confined only to the condition wherein Y is fluorine in the $\alpha$-haloxylene compound. When Y is any other halogen, this phenomenon is non-existent and the condition for the proviso with regard to X is no longer necessary. Hence, when Y is any halogen other than fluorine; such as chlorine, bromine or iodine, X can be the same halogen or a halogen having a lower bond strength than Y. For example, if Y were bromine, X could also be bromine, or, if desired, iodine.

The voltage applied to the system should be sufficient to polymerize the $\alpha$-haloxylenes employed as starting compounds but lower than the decomposition voltage of the electrolytic solvent system. Generally, the voltage applied across the electrodes can be between about 3–40 volts. The variation in the voltage required is reflected by and dependent upon the geometry and size of the electrolytic cell employed, the solvent system selected, and the ability of the starting material to be reduced. For optimum results, the cathode potential, as measured against a Calomel electrode placed in the system, should not exceed about 2.0 volts. However, depending upon the reduction-oxidation potential of the $\alpha$-haloxylene compound employed, lower cathode potentials can be realized. For example, $\alpha,\alpha,\alpha,\alpha',\alpha',\alpha'$-hexachloro-p-xylene was polymerized at a cathode potential of about $-0.7$ volt and $\alpha,\alpha'$-dibromo-$\alpha,\alpha,\alpha',\alpha'$-tetrauoro-p-xylene was polymerized at a cathode potential of $-1.10$ volts.

When cathode potentials are employed which are significantly greater than the reduction-oxidation potential of the $\alpha$-haloxylene compound used, interfering side reactions take place which result in poor polymer yield or in the production of polymers containing undesirable stilbene units.

The rate of polymerization of the $\alpha$-haloxylene compounds is directly affected by the current in the system. The conductivity, in turn, depends upon the temperature of the electrolyte, the nature and type of cathode employed and the electrolytic solvent system selected. Hence, polymeriaztion rates can be closely controlled by adjusting the current in the system. The means by which this can be accomplished are well known to those skilled in the art.

The poly-p-xylylenes obtained collect on the cathode and can be readily recovered therefrom in particulate form either continuously, as by filtration, or as a film by any suitable mechanical means. Alternatively, the electrolyte can be stirred and the polymer recovered therefrom by subsequent filtration. Hence, the polymeric end product can be recovered in desirable forms; such as, a fusible polymer, a film, a coating or as the stable, intermediate p-xylylene as when the process is conducted at low temperatures as set forth in detail hereinbelow.

The polymers obtained in accordance with the present invention have been found to be desirable for use in films, surface coatings, electrical insulation and other similar applications and have been found to be particularly useful where high resistance to thermal and chemical deterioration are required.

The following examples are set forth as being illustrative of the present invention and are not intended to be limitative thereof. Unless otherwise specified, all percentages and parts are by weight.

Example I

A platinum anode and a mercury cathode were placed in an electrolytic cell containing an electrolyte consisting of 50 ml. of dioxane, 10 ml. of water and 2.0 ml. of concentrated hydrochloric acid. 2.0 grams of $\alpha,\alpha'$-dibromo-$\alpha,\alpha,\alpha',\alpha'$-tetrafluoro-p-xylene, which can be obtained by reacting terephthaldehyde with sulfur tetrafluoride followed by bromination with N-bromo-succinimide according to the Wohl-Ziegler process, was dissolved in the electrolytic solvent. The cathode potential was kept at about 1.10 volts as measured by a Calomel electrode placed in the system by using a power source that produced a constant potential. The voltage between the anode and cathode fluctuated between about 4.9 volts–6.0 volts. The electric current in the system increased from about 60 milliamperes at the beginning of the electrolysis to about 120 milliamperes at the end of the electrolysis.

After an interval of 2 hours 30 minutes, 819 coulombs had passed through the electrolyte at which time electrolysis was interrupted.

The polymer was recovered from the solvent by filtration, washed with dioxane and dried at 120° C. under reduced pressure for 15 hours.

The amount of polymer recovered was 0.7716 gram corresponding to a current efficiency of 95%. Infrared spectrum analysis of the polymer obtained showed it to be consistent with the structure of poly($\alpha,\alpha,\alpha',\alpha'$-tetrafluoro-p-xylylene). Elemental analysis of the product as calculated for poly($\alpha,\alpha,\alpha',\alpha'$-tetrafluoro-p-xylylene) was as follows:

Calculated: 54.54% C; 2.27% H; 43.18% F. Found: 54.25% C; 2.56% H; 43.11% F.

Example II

In the same manner as is set forth in Example I above, $\alpha$-haloxylenes containing nuclear aliphatic, aromatic and alkoxy groups can also be employed to obtain the corresponding poly-p-xylylenes. That is, when such $\alpha$-haloxylenes as $\alpha,\alpha'$-dibromo-2-methyl-xylene, $\alpha,\alpha'$-dibromo-2-phenyl-p-xylene, $\alpha,\alpha'$-dibromo-2-methoxy-p-xylene are used as the starting compounds, the respectively resulting polymers are poly(2-methyl-p-xylylene), poly(2-phenyl-p-xylylene) and poly(2-methoxy-p-xylylene). These polymers are obtained by utilizing the process of Example I wherein the cathode potential is between about $-1.0$ to $-1.5$ volts, the voltage between the anode and the cathode is between 3.0–5.0 volts and the current is between about 25–90 milliamperes. Under these conditions, a current efficiency of between about 75%–80% is realized.

Examples III–VII

Various $\alpha$-haloxylenes, which can be obtained either commercially or which can be prepared in accordance with well-known techniques were electrolytically polymerized as described in Example I above. In each instance, platinum was employed for the anode and mercury for the cathode. Identification of the resulting polymers was established by infrared spectrum analysis and elemental analysis in the same manner as that set forth in Example I. The results of these examples and their respective control conditions are set forth in Table I below:

p-xylylenes can be obtained utilizing the process of the present invention is illustrated by the following example.

Example VIII

A platinum anode and a mercury cathode were placed in an electrolytic cell containing an electrolyte consisting of 100 ml. tetrahydrofuran, 20 ml. water and 4.0 ml. of concentrated hydrochloric acid. The cathode was isolated from the remainder of the system by means of a ceramic diaphragm. A 2.0 gram sample of $\alpha,\alpha,\alpha,\alpha',\alpha',\alpha'$-hexachloro-p-xylene, which was commercially obtained, was dissolved in the electrolytic solvent whose temperature was then lowered to about $-10°$ C. The cathode potential was kept at about $-0.7$ volt, as measured by a Calomel electrode placed in the system, by employing a power source that provided a constant potential. The voltage between the anode and cathode fluctuated between about 3.5 volts–4.5 volts. The current in the system increased from about 30 milliamperes at the beginning of the electrolysis to about 90 milliamperes at the end of the electrolysis.

After an interval of 62 minutes, the electrolysis was interrupted. The catholyte, that is, the liquid which surrounded the isolated cathode, was removed from the system and concentrated at a temperature of about $-10°$ C. by vacuum distillation. The concentrated catholyte was comprised of a mixture of liquid and crystals which had formed in the catholyte.

In order to establish that the resulting reactive intermediary p-xylylene, that is, tetrachloro-p-xylylene, was present in the catholyte, a portion of the crystals were isolated by filtering the catholyte mixture at about $-10°$ C. These crystals were then reacted with bromine and there was obtained therefrom $\alpha,\alpha'$-dibromo-$\alpha,\alpha,\alpha',\alpha'$-tetrachloro-p-xylylene. Identification of the resultant product was made by infrared spectrum analysis and by a comparison of its melting point with a known sample of the same compound.

The remainder of the catholyte mixture was dissolved

TABLE I

| Example | $\alpha$-haloxylene Starting Material | Cathode potential (volts) | Anode cathode voltage | Current (milliamperes) | Current efficiency (percent) | Polymer obtained |
|---|---|---|---|---|---|---|
| III | $\alpha,\alpha'$-dichloro-p-xylene | $-1.2$ | 3.0–3.5 | 28–54 | 35 | Poly(p-xylylene). |
| IV | $\alpha,\alpha,\alpha,\alpha',\alpha',\alpha'$-hexachloro-p-xylene | $-0.7$ | 3.0–6.0 | 40–110 | 95 | Poly($\alpha,\alpha,\alpha',\alpha'$-tetrachloro-p-xylylene). |
| V | $\alpha,\alpha',$-2-trichloro-p-xylene | $-1.4$ | 3.4–4.0 | 26–65 | 65 | Poly(2-chloro-p-xylylene). |
| VI | $\alpha,\alpha'$-dibromo-p-xylene | $-1.2$ | 2.5–4.5 | 25–69 | 90 | Poly(p-xylylene). |
| VII | $\alpha,\alpha'$-dibromo-2-chloro-p-xylene | $-1.2$ | 2.3–4.2 | 20–70 | 90 | Poly(2-chloro-p-xylylene). |

As is well known to those skilled in the art, conversion of p-xylenes to the corresponding poly(p-xylylenes) involves the formation of reactive intermediary p-xylylenes. Hence, when an $\alpha$-haloxylene compound, having the general structure

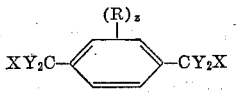

wherein X, Y, R and z are the same as has been set forth hereinabove, is converted to the corresponding poly(p-xylylene) in accordance with the present process, it is attended with the formation of reactive intermediary p-xylylenes having the general structure

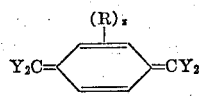

wherein Y, R, and z are as above. Under reaction conditions involving low temperatures of below about 0° C. and preferably between about 0° C. to $-10°$ C., it has been found that these reactive intermediary p-xylylenes can be isolated and subsequently stored at low temperatures of below about $-40°$ C. until desired for further use; such as for the preparation of poly(p-xylylenes).

The manner in which these reactive intermediary in 300 ml. of tetrahydrofuran resulting in a clear solution. The solution was permitted to stand at room temperature for a period of about 5 minutes whereupon a precipitate formed. The precipitate was identified by infrared spectrum analysis and elemental analysis as poly($\alpha,\alpha,\alpha',\alpha'$-tetrachloro-p-xylylene). In order to insure that polymerization was complete, the precipitate was kept under nitrogen for a period of 14 hours and then isolated from the solvent by filtration. The precipitate was then washed with tetrahydrofuran and dried. There resulted a yield of poly($\alpha,\alpha,\alpha',\alpha'$-tetrachloro-p-xylylene) in an amount of 0.1454 g. which was computed to be the equivalent of a current efficiency of 70%.

While the invention has been described in detail and with particularity, it should be understood that changes, alterations and modifications may be made in the methods, steps, materials and processes employed herein without departing from the spirit and scope of the invention as set forth in the appended claims.

What is claimed is:

1. An electrolytic process for the preparation of poly-p-xylylenes having the general structure

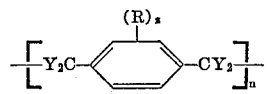

wherein Y is a member selected from the group consisting of hydrogen and halogens; R is an aromatic nuclear substitutent group; z is an integer from 0 to 4; and n is an integer of at least about 50, which comprises:

(1) admixing with an electrolyte an α-haloxylene compound having the general structure

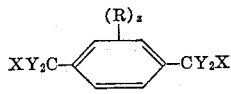

wherein Y is a member selected from the group consisting of hydrogen and halogens; R is an aromatic nuclear substituent group; X is a halogen having a bond strength no greater than that of Y with the proviso that when Y is fluorine, X is a halogen having a lower bond strength than fluorine; and z is an integer from 0 to 4;

(2) placing in the electrolyte composition an anode inert to the free halogens released during electrolysis and a cathode which exhibits an overvoltage sufficient to suppress the formation of hydrogen at the cathode;

(3) supplying an electromotive potential across said anode and cathode which results in a cathode potential sufficient to reduce said α-haloxylene compound; and (4) recovering a poly-p-xylylene from the cathode.

2. The process of claim 1 wherein the electrolyte consists of a water-soluble organic solvent and water.

3. The process of claim 1 wherein the anode is selected from the group consisting of platinum, platinum metals and carbon.

4. The process of claim 1 wherein the cathode is selected from the group consisting of mercury, lead, cadmium, zinc and aluminum.

5. The process of claim 1 wherein the cathode potential is no greater than about 2.0 volts.

6. The process of claim 1 wherein the poly-p-xylylene is recovered as a coating on the cathode.

7. The process of claim 6 wherein the cathode is selected from the group consisting of mercury, lead, cadmium, zinc and aluminum.

8. The process of claim 2 wherein a compound capable of dissociating into ions is added to the electrolyte in an amount of between about 2%–6% by volume.

9. The process of claim 8 wherein a concentrated mineral acid is added to the electrolyte in an amount of between about 2%–6% by volume.

10. An electrolytic process for the preparation of poly-p-xylylene which comprises:

(1) admixing with an electrolyte consisting of water and a water-soluble organic solvent, an α-haloxylene compound having the general structure

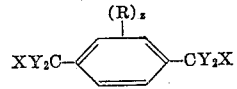

wherein Y is a member selected from the group consisting of hydrogen and halogens; R is an aromatic nuclear substituent group; X is a halogen having a bond strength no greater than that of Y with the proviso that when Y is fluorine X is a halogen having a lower bond strength than fluorine; and z is an integer from 0 to 4;

(2) placing in the electrolyte composition an anode selected from the group consisting of platinum, platinum metals and carbon and a cathode selected from the group consisting of mercury, lead, cadmium, zinc and aluminum;

(3) supplying an electromotive potential across said anode and said cathode which results in a cathode potential no greater than about 2.0 volts; and (4) recovering from the cathode a poly-p-xylylene having the general structure

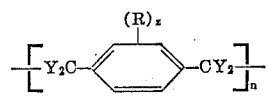

wherein Y is a member selected from the group consisting of hydrogen and halogens; R is an aromatic nuclear substituent group; z is an integer from 0 to 4; and n is an integer having a value of at least about 50.

11. The process of claim 10 wherein the anode is platinum.

12. The process of claim 10 wherein the cathode is mercury.

13. The process of claim 10 wherein a compound capable of dissociation into ions is added to the electrolyte in an amount of between about 2%–6% by volume.

14. The process of claim 13 wherein a concentrated mineral acid is added to electrolyte in an amount of between about 2%–6% by volume.

15. An electrolytic process for the preparation of poly-p-xylylenes which comprises:

(1) admixing with an electrolyte consisting of water and a water-soluble organic solvent selected from the group consisting tetrahydrofuran, dioxane, and dimethylformamide, a compound having the general structure

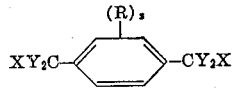

wherein Y is a member selected from the group consisting of hydrogen and halogens; R is an aromatic nuclear substituent group; X is a halogen having a bond strength no greater than that of Y with the proviso that when Y is fluorine X is a halogen having a lower bond strength than fluorine; and z is an integer from 0 to 4;

(2) placing in the electrolyte composition an anode selected from the group consisting of platinum, platinum metals and carbon and a cathode selected from the group consisting of mercury, lead, zinc and aluminum;

(3) supplying an electromotive potential across the anode and the cathode which results in a cathode potential no greater than about 2.0 volts; and (4) recovering from the cathode a poly-p-xylylene having the general structure

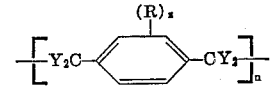

wherein Y is a member selected from the group consisting of hydrogen and halogens; R is an aromatic nuclear substituent group; z is an integer from 0 to 4; and n is an integer having a value of at least about 50.

16. The process of claim 15 wherein the water-soluble organic solvent is dioxane.

17. The process of claim 16 wherein a compound capable of dissociating into ions is added to the electrolyte in an amount of between about 2%–6% by volume.

18. The process of claim 17 wherein a concentrated mineral acid is added to the electrolyte in an amount of between about 2%–6% by volume.

19. An electrolytic process for the preparation of reactive intermediary p-xylylenes having the general sructure

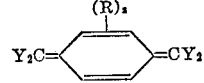

wherein Y is a member selected from the group consisting of hydrogen and halogens; R is an aromatic nuclear substituent group; and $z$ is an integer from 0. to 4, which comprises:
(1) admixing with an electrolyte composition maintained at a temperature below about 0° C. an α-haloxylene compound having the general structure:

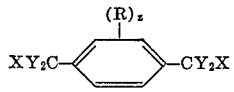

wherein Y is a member selected from the group consisting of hydrogen and halogens; R is an aromatic nuclear substituent group; X is a halogen having a bond strength no greater than that of Y with the proviso that when Y is fluorine, X is a halogen having a lower bond strength than fluorine; and $z$ is an integer from 0 to 4;
(2) placing in the electrolyte composition an anode inert to the free halogens released during electrolysis, and a cathode which exhibits an overvoltage sufficient to suppress the formation of hydrogen at the cathode;
(3) supplying an electromotive potential across said anode and cathode which results in a cathode potential sufficient to reduce said α-haloxylene compound; and
(4) recovering from the electrolyte a catholyte which contains the reactive intermediary p-xylyenes in stable form.

20. The process of claim 19 wherein the anode is a member selected from the group consisting of platinum. platinum metals and carbon.

21. The process of claim 19 wherein the cathode is a member selected from the group consisting of mercury, lead, cadmium, zinc and aluminum.

22. The process of claim 19 wherein the cathode potential is no greater than about 2.0 volts.

23. The process of claim 19 wherein the cathode is isolated from the electrolyte composition by means of a diaphragm which is inert to the electrolyte.

24. The process of claim 19 wherein the temperature of the electrolyte during electrolysis is between about 0° C. to —10° C.

25. The process of claim 19 wherein the reactive intermediary p-xylylenes contained in the catholyte are maintained under a temperature of below about —40° C.

26. The process of claim 19 wherein the reactive intermediary p-xylylenes contained in the catholyte are permitted to polymerize by raising the temperature of said catholyte to between about 0° C.–25° C.

27. The process of claim 19 wherein the reactive intermediary p-xylylenes contained in the catholyte and having the general structure

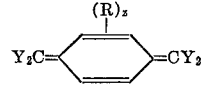

wherein Y is a member selected from the group consisting of hydrogen and halogens; R is an aromatic nuclear substituent group; and $z$ is an integer from 0. to 4 are reacted with a member selected from the group consisting of halogens having a bond strength no greater than Y with the proviso that when Y is fluorine, said halogens have a lower bond strength than fluorine to form α-halo-p-xylylenes having the general structure:

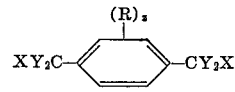

wherein Y, R and $z$ are as above and X is the halogen member.

28. The process of claim 19 wherein the electrolyte consists of water and a water-soluble organic solvent which is a member selected from the group consisting of tetrahydrofuran dioxane, and dimethylformamide.

29. The process of claim 28 wherein a compound capable of dissociating into ions is added to the electrolyte in an amount of between about 2%–6% by volume.

30. The process of claim 29 wherein a concentrated mineral acid is added to the electrolyte in an amount of between about 2%–6% by volume.

References Cited
UNITED STATES PATENTS

| | | | |
|---|---|---|---|
| 2,777,005 | 1/1957 | Errede | 260—668 |
| 3,053,909 | 10/1962 | Davis et al. | 260—651 |
| 3,140,276 | 7/1964 | Forster | 204—59 X |

JOHN H. MACK, *Primary Examiner.*

H. M. FLOURNOY, *Assistant Examiner.*